Nov. 14, 1933.  K. E. LYMAN  1,935,368
BRAKE
Filed Dec. 6, 1928
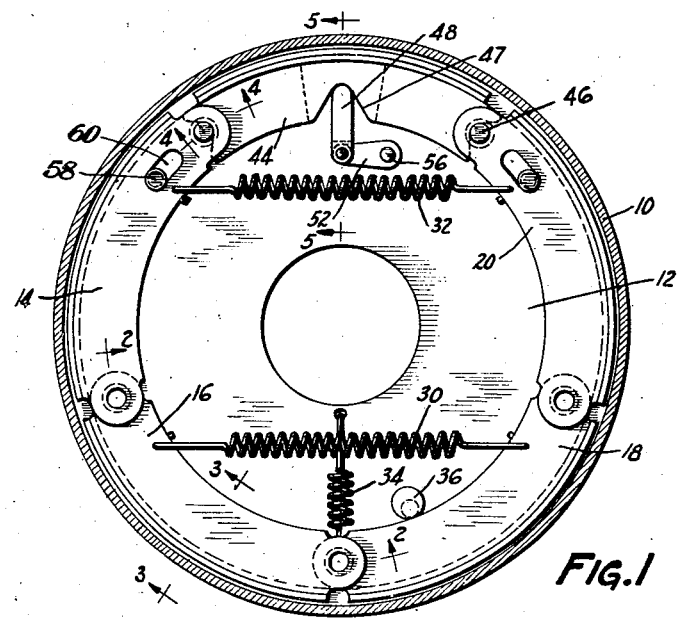
Fig.1
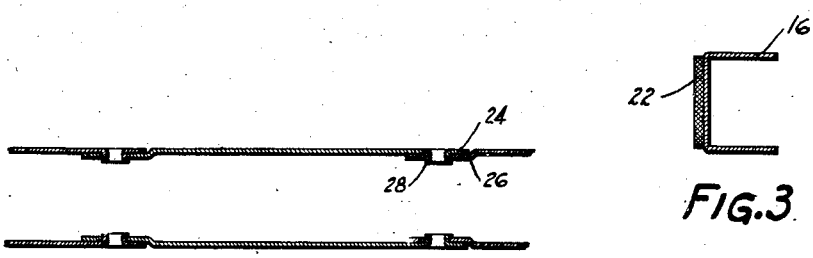
Fig.2
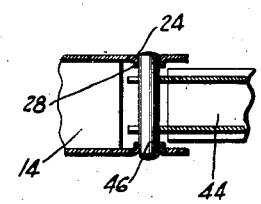
Fig.3
Fig.4
Fig.5
Fig.7
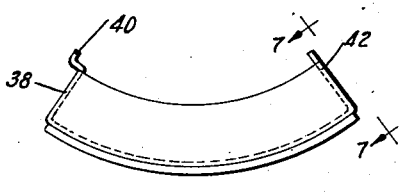
Fig.6
INVENTOR.
KENNETH E. LYMAN
BY
ATTORNEY Patented Nov. 14, 1933

1,935,368

UNITED STATES PATENT OFFICE

1,935,368
BRAKE

Kenneth E. Lyman, Rockford, Ill., assignor to Bendix Brake Company, South Bend, Ind., a corporation of Illinois Application December 6, 1928. Serial No. 324,114

8 Claims. (Cl. 188—78)

This invention relates to brakes and is illustrated as embodied in an internal expanding brake for an automobile. An object of the invention is to provide a simple and inexpensive brake which has a powerful servo-action.

Various features of novelty relate to the arrangement of a channel-shaped servo-shoe having spaced webs straddled by the ends of juxtaposed shoes or their equivalents constituting the principal friction medium and arranged for direct thrust engagement with laterally extending members carried by the shoe; to a novel notched construction of the servo-shoe to co-operate with a novel crank and link operating mechanism; and to a novel friction means comprising a plurality of hinged channel-shaped segments and to particular means for connecting said segments.

The above and other objects and features of the invention will be apparent from the following description of illustrative embodiments shown in the accompanying drawing, in which:

Figure 1 is a vertical section through the brake, just inside the head of the brake drum, and showing the brake shoes in side elevation;

Figure 2 is a partial circumferential section on the line 2—2 of Figure 1 and showing the hinged connecting structure of the articulated friction means;

Figure 3 is a section on the line 3—3 of Figure 1 showing the channel shape of the various shoes;

Figure 4 is a partial section on the line 4—4 of Figure 1 indicating the connection between the servoshoe and main body of the friction means;

Figure 5 is a detail view indicating the crank and link actuating structure;

Figure 6 discloses a modified form of shoe; and

Figure 7 is an end view thereof looking in the direction of the arrows 7—7, Figure 6.

The illustrated brake includes a rotatable drum 10, at the open side of which is a suitable support such as the usual backing plate 12, and within which is arranged the friction means of the brake. Preferably such friction means is of the floating type arranged to anchor at one end when the drum is turning in one direction and at the other end when the drum is turning in the other direction, and it may include four interchangeable shoes 14, 16, 18 and 20.

These shoes embody substantial novelty and, as disclosed in Figures 2 and 3, may be fabricated from sheet steel stock and pressed to define a channel section, the usual friction lining 22 being securely fastened to the channel base constituting the rim of the shoes. The webs at the ends of the shoes are preferably provided with rounded ears 24, those at one end being slightly offset at 26 and provided with holes to receive tubular projections 28 on the corresponding end of the adjacent shoe. The shoes are thus securely hinged together to provide an effective articulated friction element.

Return springs 30 and 32 yieldingly connect the shoes and spring 34 urges the friction means into contact with an adjustable eccentric stop 36 determining its idle position.

An alternative shoe structure is disclosed in Figures 6 and 7 in which each shoe may be provided with radially extending end flanges 38, having a hook 40 on one flange and a slot 42 in the other, the hook 40 adapted to fit within the slot 42 in the adjacent shoe. The shoes connected to the servo-shoe are provided at one end with rounded ears 24 as in the preferred form.

According to an important feature of my invention, the friction means is adapted to be urged into drum contact by a novel servo-shoe 44 generally similar to the shoes previously described in being channel-shaped in section. The webs at each end of the servo-shoe are preferably recessed to fit over pins 46, the latter being housed in the projection 28, one at each end of the friction means.

The servo-shoe may be urged into drum contact by a rod 48 engaging a suitable notch 47 in the shoe and pivotally connected to a crank 52 actuated by a rock shaft 56 having its bearing in the backing plate.

In operation the servo-shoe when forced against the drum will turn in one direction or the other to thrust against one or the other of the shoe members 14 or 20 to apply the friction means as an entirety, which means is anchored on either one of two anchor pins 58 depending upon the direction of drum rotation, which pins are rigidly fixed to the backing plate and pass through slots 60 in the ends of shoes 14 and 20. In forward braking, shoe 14 applies shoe 16 which in turn applies shoe 18, the latter applying shoe 20 which takes the braking torque at the anchor pin. A power-servo and self energizing action takes place within the friction means, each shoe serving by virtue of its kinetic energy to energize or actuate its adjoining shoe.

While one illustrative embodiment has been described in detail, it is not my intention to limit the scope of the invention to that particular embodiment or otherwise than by the terms of the appended claims.

I claim:

1. A brake comprising, in combination, a floating friction device including a plurality of channel-shaped shoes, said device having adjacent anchored ends formed with transversely extending thrust pins, and applying means for said shoes acting on the thrust pins.

2. A brake comprising, in combination, a floating friction device including a plurality of channel-shaped shoes, said device having adjacent anchored ends formed with transversely extending thrust pins and a servo shoe arranged to contact said pins.

3. A brake comprising, in combination, a drum, a pair of fixed anchors, a friction device including interconnected channel-sectioned shoes slotted for engagement with the anchors, transversely extending thrust pins in the adjacent ends of the device and a servo-operating shoe notched at its ends to bear against the thrust pins on said friction device.

4. A brake comprising, in combination, friction means, a channel-shaped servo shoe shifting lengthwise and operating the friction means and having a notched block seated within the channel of the shoe, and operating means for the servo shoe, including a crank and a link pivoted to the crank and engaging the notch in said block.

5. A brake comprising a plurality of interconnected brake shoes and a disconnected floating servo shoe for successively actuating the interconnected shoes.

6. A brake comprising a friction member, a plurality of interconnected brake shoes providing a substantially continuous circular braking surface and a disconnected floating servo shoe for successively actuating the interconnected shoes.

7. A brake comprising a plurality of interconnected brake shoes arranged to anchor on different shoes in forward and reverse braking, a floating servo shoe for successively actuating the interconnected shoes, a disconnected thrust link for actuating said servo shoe, and means maintaining said thrust link in proper position upon said servo shoe.

8. A brake comprising a drum, a friction member comprising a plurality of interlocking shoes providing a substantially continuous braking surface, and a floating servo shoe for successively actuating the interconnected shoes.

KENNETH E. LYMAN.